US010356009B2

(12) United States Patent
Gauffriau et al.

(10) Patent No.: US 10,356,009 B2
(45) Date of Patent: Jul. 16, 2019

(54) PROCESSOR DESIGNED FOR A DETERMINISTIC SWITCHED ETHERNET NETWORK

(71) Applicant: Airbus Operations (S.A.S.), Toulouse (FR)

(72) Inventors: Adrien Gauffriau, Colomiers (FR); Benoît Triquet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 23 days.

(21) Appl. No.: 15/714,625

(22) Filed: Sep. 25, 2017

(65) Prior Publication Data
US 2018/0097747 A1   Apr. 5, 2018

(30) Foreign Application Priority Data

Oct. 5, 2016  (FR) ..................... 16 59601

(51) Int. Cl.
*G06F 15/80* (2006.01)
*H04L 29/08* (2006.01)
*H04L 12/721* (2013.01)
*H04L 12/741* (2013.01)
*H04L 12/931* (2013.01)

(52) U.S. Cl.
CPC ............ *H04L 49/351* (2013.01); *H04L 45/66* (2013.01); *H04L 45/745* (2013.01); *H04L 67/12* (2013.01); *G06F 15/80* (2013.01)

(58) Field of Classification Search
CPC ....... H04L 49/351; H04L 67/12; H04L 45/66; H04L 45/745; G06F 15/80
See application file for complete search history.

(56) References Cited

U.S. PATENT DOCUMENTS

| 9,762,509 | B2* | 9/2017 | Rang ..................... H04L 49/351 |
| 9,787,610 | B2* | 10/2017 | Koch ......................... H04L 1/02 |
| 9,967,172 | B2* | 5/2018 | Kao .................... H04B 7/18506 |
| 10,027,570 | B2* | 7/2018 | Portes ..................... H04L 45/02 |
| 10,033,664 | B2* | 7/2018 | Lembcke .............. H04L 49/351 |
| 10,193,830 | B2* | 1/2019 | Saint-Etienne ..... H04L 12/4641 |
| 2008/0043768 | A1* | 2/2008 | Lopez ................. H04L 47/2416 370/412 |
| 2008/0239973 | A1* | 10/2008 | Cabaret ..................... H04L 1/22 370/250 |
| 2013/0179528 | A1 | 7/2013 | Gianisis et al. |
| 2014/0215491 | A1 | 7/2014 | Addepalli et al. |

(Continued)

OTHER PUBLICATIONS

French Search Report for French Application No. 1659601 dated May 19, 2017.

*Primary Examiner* — Brian T O Connor
(74) *Attorney, Agent, or Firm* — Jenkins, Wilson, Taylor & Hunt, P.A.

(57) ABSTRACT

Multiple-core processor to be connected, by way of communication ports, to a deterministic switched Ethernet network using virtual links to which items of equipment are connected, the processor including clusters each including cores, wherein at least one cluster of the processor implements a switch function that makes it possible to interconnect the items of equipment in the network. At least one cluster of the processor implements an end system function providing functions of sending and receiving data in the network, and at least one cluster of the processor implements an application.

9 Claims, 4 Drawing Sheets

(56) References Cited

U.S. PATENT DOCUMENTS

| | | | | |
|---|---|---|---|---|
| 2015/0106473 | A1* | 4/2015 | Bobrek | H04L 67/12 |
| | | | | 709/217 |
| 2015/0281130 | A1* | 10/2015 | Lembcke | H04L 49/351 |
| | | | | 370/276 |
| 2016/0154391 | A1* | 6/2016 | Pavaskar | G05B 15/02 |
| | | | | 701/3 |
| 2016/0191426 | A1* | 6/2016 | Koch | H04L 1/02 |
| | | | | 370/242 |
| 2016/0308751 | A1* | 10/2016 | Rang | H04L 49/351 |
| 2017/0257320 | A1* | 9/2017 | Bolling | H04L 47/12 |
| 2017/0295034 | A1* | 10/2017 | Saint-Etienne | H04L 12/4641 |

\* cited by examiner

PROCESSOR DESIGNED FOR A DETERMINISTIC SWITCHED ETHERNET NETWORK

CROSS-REFERENCE TO RELATED APPLICATION

This patent application claims priority to French patent application FR 16 59601, filed on Oct. 5, 2016, the entire disclosure of which is incorporated by reference herein.

TECHNICAL FIELD

The present disclosure relates to a multiple-core processor intended to be used in a deterministic switched Ethernet network, and to a deterministic switched Ethernet network comprising the processor.

BACKGROUND

The disclosure herein relates to the field of communication networks, and more particularly to communication networks on board aircraft.

Aircraft generally have one or more on-board communication networks that are provided to enable communications between on-board items of equipment, in particular on-board computers such as LRUs ('Line Replaceable Unit', a replaceable unit specific to one function) or LRMs ('Line Replaceable Module', a generic replaceable unit). In order to satisfy regulatory requirements in terms of certification of the aircraft, an on-board communication network has to be deterministic. A communication network is deterministic if it enables a transmission of information between items of equipment that are connected to this network with a duration of transmission (i.e. a latency) of less than a predetermined duration, and a guarantee that information will not be lost during the transmission. The standard ARINC 664 Part 7 defines a deterministic on-board communication network, based on a full-duplex Ethernet technology. Such a network may correspond, for example, to an AFDX® communication network.

A network in accordance with the standard ARINC 664 Part 7 comprises at least one switch that makes it possible to interconnect items of equipment and end systems that provide functions of sending and receiving data in the network. Each communication between items of equipment of the network uses virtual links that are predefined when the network is configured. A virtual link is defined between a sending item of equipment and one or more receiving items of equipment, via one or more switches of the network. All communications between items of equipment are defined in advance, through the definition of the virtual links, in order to enable the switches to be configured. Each switch includes a configuration table that is predefined depending on the virtual links passing through this switch.

A switch generally includes a large number of communication ports, such as Ethernet ports, for example 24 ports for some switches. Now, the greater the number of communication ports of the switch, the greater the number of virtual links that are liable to pass through this switch, and the more complex and larger in size the configuration table. Given the complexity of such a switch, in order to respect requirements in particular in terms of latency time, this switch is generally implemented by a specific electronic device. The same applies for the end systems.

A modern aircraft may include a high number of specific devices implementing switches or end systems. This results in a mass, a bulk and an electrical consumption that it would be beneficial to reduce in order to improve the performance of the aircraft.

Alternative solutions exist that use processors and generic Ethernet controllers. However, these solutions do not enable sufficient rates to be achieved.

It is desirable to mitigate these drawbacks of the state of the art. It is in particular desirable to propose a system that makes it possible to reduce the cost and the weight of the deterministic switched Ethernet networks using virtual links, while attaining sufficient rates. It is desirable in addition to define a system that is designed to host applications, end systems and at least one switch in a single item of equipment.

SUMMARY

According to one aspect of the present disclosure, the present disclosure relates to a multiple-core processor-type device that is intended to be connected, by way of communication ports, to a deterministic switched Ethernet network using virtual links to which items of equipment are connected, the processor comprising a plurality of clusters each comprising a plurality of cores, characterized in that at least one cluster of the processor implements a switch function that makes it possible to interconnect the items of equipment in the network, at least one cluster of the processor implements an end system function providing functions of sending and receiving data in the network, and at least one cluster of the processor implements an application.

In this way, one and the same processor implements at least one switch function, at least one end system function and at least one application, thereby considerably reducing the weight, the bulk and the cost linked with the implementation of such functions and applications.

According to one embodiment, each cluster implementing a switch function is an application cluster of the processor that is able to implement applications, at least one first core of each cluster implementing a switch function is allocated to a function of routing frames received on a communication port of the processor, the routing function including analyzing each received frame and using a predefined static routing table in order to determine, for each received frame, a communication port of the processor on which each frame has to be sent, and a second core of the cluster implementing a switch function is allocated to a function of sending each received frame on the determined communication port.

According to one embodiment, each first core supplies each received frame to be sent to the second core by way of a memory queue of first in, first out type.

According to one embodiment, each cluster implementing an end system function comprises a reception part, the reception part being implemented by an input/output cluster of the processor that is dedicated to communicating with resources external to the processor, following a reception of a frame in an internal memory of the cluster implementing the reception part of the end system function, a first, a second and a third of the cluster implement the reception part of the end system.

According to one embodiment, the first core analyzes a header of the frame and performs a search in a predefined configuration table in order to determine an address of a buffer memory zone in a memory external to the processor to be used for storing the frame, the second core provides a function of transferring the frame between the internal memory of the cluster and the external memory.

According to one embodiment, the third core implements a requests service enabling application clusters of the processor that are implementing applications to access, by way of the cluster implementing the reception part of the end system function, the external memory in order to recover data therefrom at the moment when the application requires them.

According to one embodiment, each cluster implementing an end system function comprises a sending part, the sending part using a shared calendar stored in an internal memory of an input/output cluster of the processor that is dedicated to communicating with resources external to the processor, the calendar comprising a succession of time periods, each time period being able to be associated with one or more virtual links on which frames have to be sent during the time period, the calendar being populated by applications implemented by application clusters of the processor and being read by a core of a cluster implementing the sending part of the end system function that takes charge of each sending of a frame to be carried out when, at a current instant, the calendar indicates that sending of a frame has to be carried out.

According to a second aspect of the disclosure herein, the disclosure herein relates to a deterministic switched Ethernet network-type system using virtual links to which items of equipment are connected, comprising a device according to the first aspect.

According to a third aspect of the disclosure herein, the disclosure herein relates to a vehicle comprising a system according to the second aspect.

According to one embodiment, the vehicle is an aircraft.

BRIEF DESCRIPTION OF THE DRAWINGS

The abovementioned features of the present disclosure, as well as others, will become more clearly apparent upon reading the following description of an exemplary embodiment, the description being given with reference to the appended drawings, in which.

DETAILED DESCRIPTION

The detailed description below focuses on describing an embodiment of the present disclosure in the context of an aircraft comprising a deterministic switched Ethernet network using virtual links in accordance with the standard ARINC 664 Part 7. The principles of the present disclosure apply, however, in a wider context, and could apply to other types of vehicle, such as a boat, a drone, a motor vehicle, comprising such a network. Moreover, the disclosure herein applies to all types of deterministic Ethernet network using virtual links, these networks not necessarily being in accordance with the standard ARINC 664 Part 7. The disclosure herein could also be implemented in a context other than a vehicle, on any device or appliance comprising a deterministic switched Ethernet network using virtual links.

Figure 1:
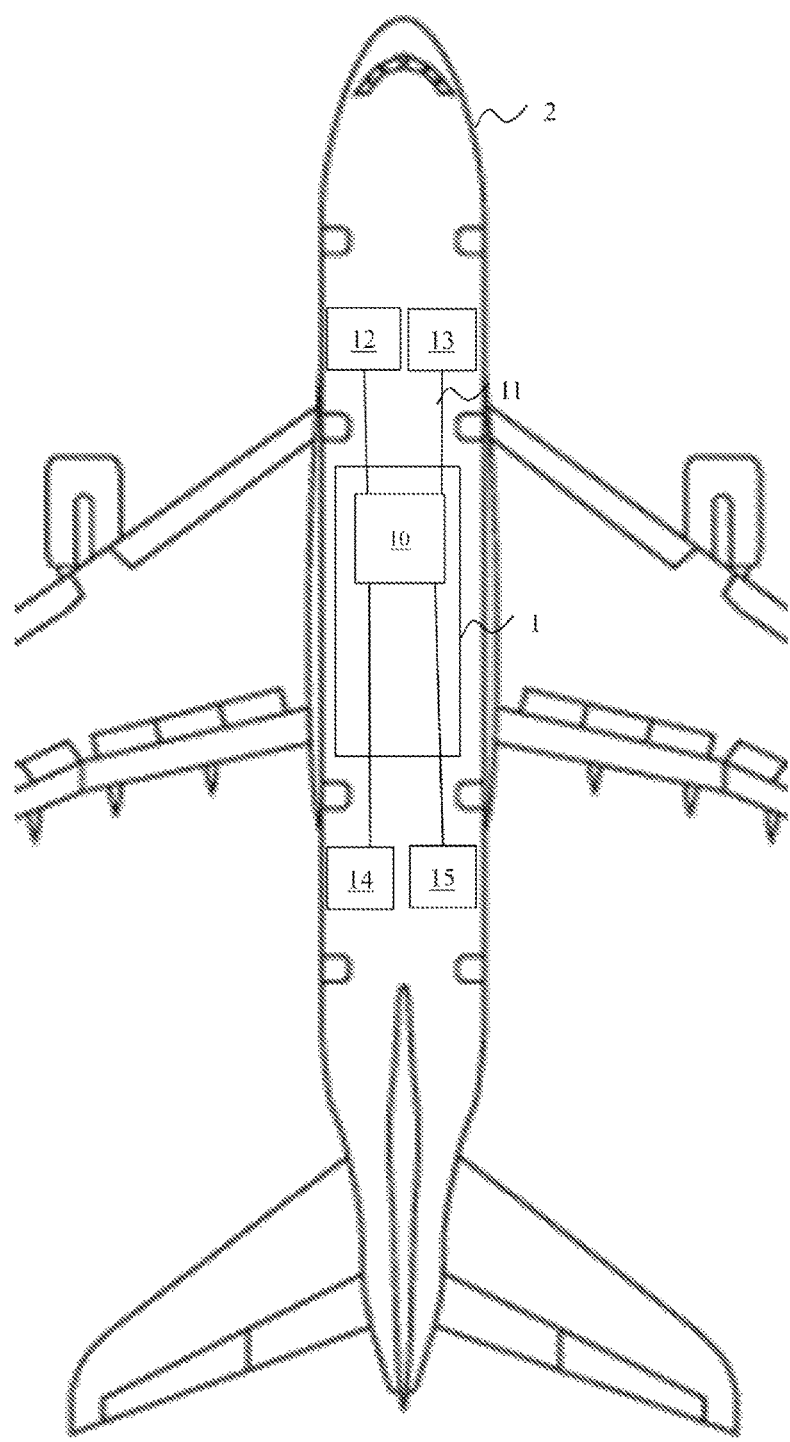
FIG. 1 schematically illustrates an example of a vehicle in which the disclosure herein is implemented.

FIG. 1 schematically illustrates an example of a vehicle in which the disclosure herein is implemented. The vehicle is an aircraft 2. This aircraft 2 comprises a processing unit 1 comprising a processor 10. The processor 10 is a multiple-core processor. As is described hereinafter, the processor 10 implements various functions, including applications, end system functions and at least one switch function. This processor is connected to a deterministic switched Ethernet network using virtual links 11 in accordance with the standard ARINC 664 Part 7. On-board items of equipment 12, 13, 14 and 15 are themselves also linked to the Ethernet network.

A differentiation is made between two types of multiple-core processors: those termed manycore processors, and multicore processors. Manycore processors differ from multicore processors in the number of cores in one and the same processor. Thus, an order of magnitude of the number of cores in a multicore processor is around ten cores, while a manycore processor may contain around a hundred or even a thousand cores. Manycore and multicore processors thus have different architectures that are adapted to the number of cores.

In general, manycore processors are organized into clusters that group together a plurality of cores sharing resources local to the cluster. The clusters of a manycore processor are able to communicate with one another and with resources external to the cluster by using a network internal to the processor called network on chip (NoC). A network on chip NoC may for example be a meshed network.

Some manycore processor topologies include two types of cluster: application clusters dedicated to executing applications, and input/output clusters dedicated to communicating with resources external to the processor.

The description herein focuses on describing an embodiment of the present disclosure using a manycore processor. The principles of the present disclosure apply, however, in a wider context, and could apply to multicore processors.

Figure 2:
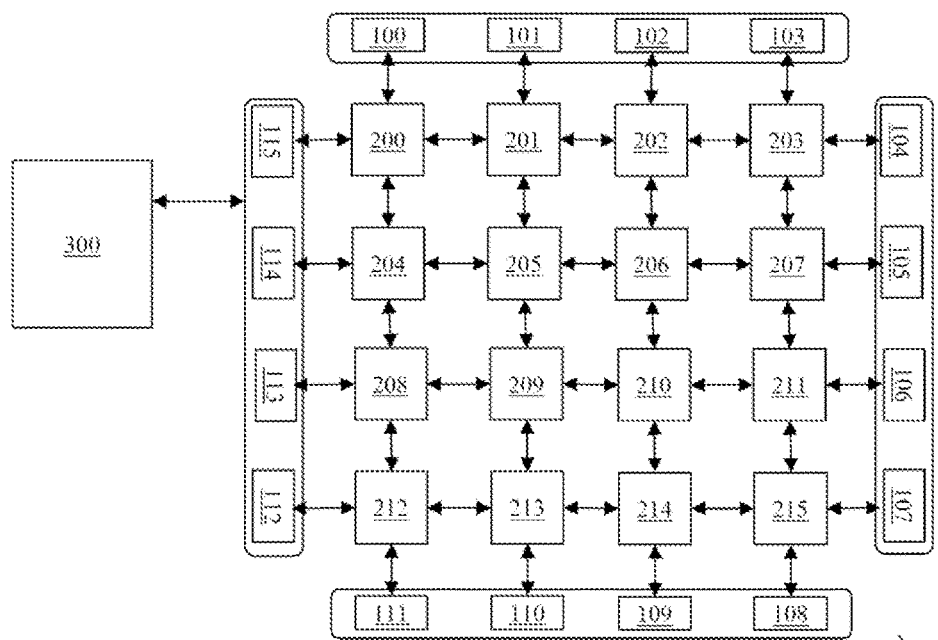
FIG. 2 schematically illustrates an example of a manycore processor.

FIG. 2 schematically illustrates an example of a manycore processor 10.

The manycore processor 10 comprises a plurality of application clusters 200 to 215 (here '16' application clusters) and a plurality of input/output clusters 100 to 115 (here '16' input/output clusters). At least one of the input/output clusters is designed to communicate with an external memory 300, for example of DDR SDRAM (Double Data Rate Synchronous Dynamic Random Access Memory) type. Communications between the (application and/or input/output) clusters use a meshed network on chip NoC. In this meshed network on chip NoC, each application cluster is linked to '4' other (application and/or input/output) clusters, and each input/output cluster is linked to an application cluster. Each input/output cluster comprises a plurality of cores, termed input/output cores.

The manycore processor 10 comprises a plurality of external communication ports, not shown, including Ethernet ports, which are physical interfaces between the manycore processor 10 and the deterministic switched Ethernet network using virtual links 11.

Figure 3:
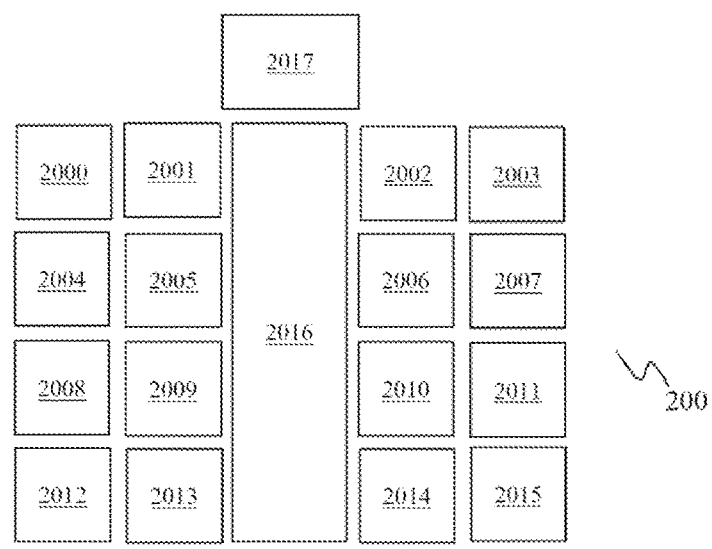
FIG. 3 schematically illustrates an example of a cluster.

FIG. 3 schematically illustrates an example of an application cluster 200.

The application cluster 200 comprises '16' cores, numbered 2000 to 2015, termed application cores, a shared internal memory 2016, and a resource management core 2017. The resource management core 2017 has privileges that make it possible to configure various resources of the application cluster 200, and in particular to configure the network on chip NoC. All of the clusters of the manycore processor 10 are assumed to be identical to the application cluster 200.

In the processor 10, at least one input/output core executes a master process, which gives rise to slave processes. Each slave process is executed by an application cluster. When an application cluster implements an application, at least one application core from this cluster takes charge of an execution of the application. When the application is broken down into a plurality of parallel tasks ('multithreading'), a plurality of application cores of the application cluster may be involved in parallel in the execution of the application. The application cores share the internal memory of the application cluster to which they belong during the execution of the tasks.

As mentioned above, the manycore processor 10 implements at least one switch function. Each switch function is implemented by an application cluster. The switch function is implemented in a distributed manner by a plurality of application cores.

One aim of the switch function is to receive frames in accordance with the standard ARINC 664 Part 7, simply called frames hereinafter, on an Ethernet communication port of the manycore processor 10, to analyze these frames, and to return them on Ethernet communication ports of the manycore processor 10 that are defined in a static routing table. The frames are received from an on-board item of equipment connected to the deterministic switched Ethernet network using virtual links 11, and sent in the direction of another on-board item of equipment connected to the Ethernet network 11.

In a network in accordance with the standard ARINC 664 Part 7, there is a flow of data from different on-board items of equipment or from different applications. These on-board items of equipment or applications have levels of criticality ('Development Assurance Level' (DAL)) that may be different. It is desirable to prevent an on-board item of equipment or an application with a low level of criticality from interfering with data from another on-board item of equipment or from another application having a high level of criticality. In order to prevent this interference, a large spatial segregation is provided between the frames that are received or transmitted by each of the Ethernet communication ports. To achieve this, at least two application cores are allocated to each port. Moreover, memory spaces are assigned that are different for the data of each of the ports. In addition, privileges are assigned for each processor processing the data of a port. If a processor attempts to access a memory zone of another port, a hardware exception will be raised. Isolation of the data is thus guaranteed. This spatial segregation makes it possible to isolate problems that may arise on an Ethernet communication port, in such a way that these problems do not affect other Ethernet communication ports.

At least one first application core implementing the switch is allocated to a frame routing function. When a frame is received on an Ethernet communication port of the manycore processor 10, the first application core analyzes the frame, and uses a predefined static routing table in order to determine, for each frame, the Ethernet communication port on which each frame has to be sent.

A second application core of the application cluster implementing the switch is allocated to a function of sending the received frames on the determined communication port.

Each first application core supplies the frames to be sent to the second application core by way of a memory queue of first in, first out (FIFO) type. More precisely, each first core deposits an item of information representative of each frame to be transmitted (i.e. deposits a pointer on a zone of the internal memory of the application cluster in which each frame to be transmitted is stored) in the queue. The second application core verifies the presence of an item of information representative of a frame to be sent in the queue, and when at least one item of information representative of a frame to be sent is present, each corresponding frame to be sent is sent in the order in which the information representative of the frames was inserted into the memory queue.

In one embodiment, the second application core oversees the release of the memory zones storing frames in the internal memory of the application cluster when each processing operation to be applied to the frames has been applied.

In one embodiment, a third application core, different from each first and from the second application core, oversees the release of the memory zones storing frames when each processing operation to be applied to the frames has been applied.

It is thus the third core (or the second core) that provides a 'garbage collector' function.

In one embodiment, a plurality of application clusters of the manycore processor 10 each implement a different switch function.

Figure 6:
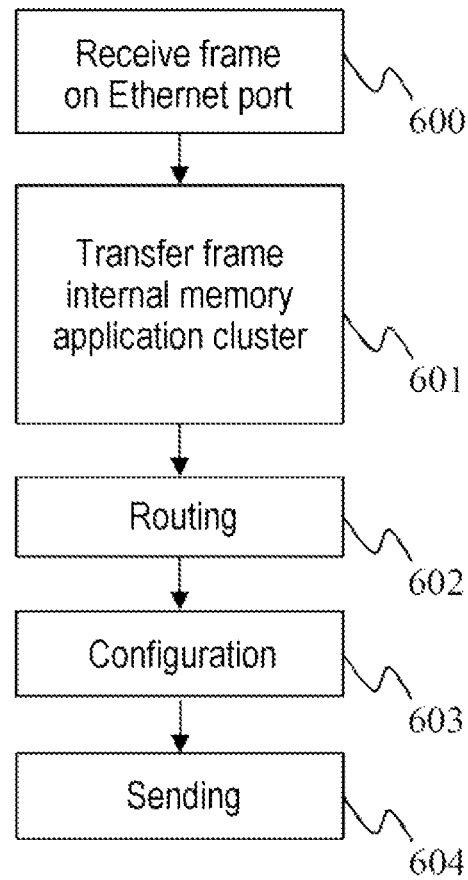

FIG. 6 schematically illustrates mechanisms implemented by the manycore processor 10 when a switch function is implemented by an application cluster.

In a step 600, the manycore processor 10 receives a frame on an Ethernet communication port. This Ethernet communication port corresponds to a physical interface on a virtual link to which the on-board item of equipment that sent the frame is connected.

In a step 601, the frame is transferred to the internal memory of the application cluster hosting the switch function. This transfer is ensured by a static configuration of a direct memory access (DMA) controller of the manycore processor 10, and by using the network on chip NoC.

In a step 602, the first core providing the routing function determines the Ethernet communication port on which the frame has to be sent, and makes the frame available to the second core providing the sending function by way of the memory queue that is intended for this purpose.

In a step 603, the second core configures hardware mechanisms of the processor 10 ensuring the transfer of the frame from the internal memory of the application cluster to the determined Ethernet port.

In a step 604, the hardware mechanisms send the frame on the determined Ethernet communication port. This Ethernet communication port corresponds to a physical interface on a virtual link to which the on-board item of equipment that receives the frame is connected. The memory zone storing the frame in the internal memory of the application cluster hosting the switch function is then released.

Moreover, the manycore processor 10 implements at least one end system function. It is therefore necessary to differentiate between a reception part and a sending part of an end system.

The reception part of an end system is implemented by an input/output cluster. Just like an application cluster, an input/output cluster has an internal memory that is shared between the cores of this input/output cluster. This internal memory is not sufficient for receiving a set of frames that are to be processed by the end system function. Each frame is therefore received, in a first instance, in buffer memory zones that are typically termed mailboxes and that are situated in a memory external to the manycore processor 10. The implementation of an end system by an input/output cluster is justified by the fact that, out of all of the clusters that make up the manycore processor 10, only the input/output clusters are able to access the external memory quickly and directly. Following this reception in a mailbox, each frame is taken charge of by hardware mechanisms, which write the frame to the internal memory of the input/output cluster.

Following this writing of the frame to the internal memory of the input/output cluster, a first, a second and a third core of the input/output cluster implement the reception part of the end system.

The first core analyzes a MAC ('Medium Access Control') header of the frame, and performs a search in a predefined configuration table in order to determine a mailbox address to be used for storing the frame.

The first core communicates with the second core by way of a memory queue of first in, first out (FIFO) type. Using this memory queue, the first core communicates, to the second core, an address, in the internal memory of the input/output cluster, of the frame and an address, in the external memory, of the mailbox to be used for storing the frame.

The second core provides a function of transferring the frame between the internal memory of the input/output cluster and the external memory, i.e. between the address in the internal memory of the input/output cluster and the address in the external memory.

The third core implements a requests service, which requests are in accordance with the standard ARINC 664 Part 7, enabling the application clusters of the manycore processor 10 that are implementing applications to access, by way of the input/output cluster, the external memory in order to recover data therefrom at the moment when the application requires them. When an application implemented by an application cluster has to recover an item of data from the external memory, it transmits a request to the input/output cluster by way of the network on chip NoC. The input/output cluster then accesses the external memory in order to recover the desired item of data therefrom, and retransmits this item of data to the application cluster by way of the network on chip NoC.

Figure 4A:
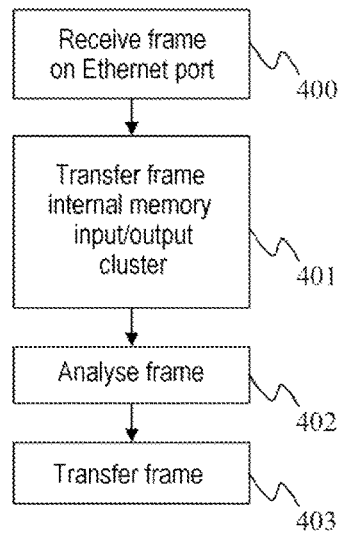
FIG. 4A schematically illustrates mechanisms implemented by a manycore processor when a frame is received by an end function.

FIG. 4A schematically illustrates mechanisms implemented by the processor 10 when a frame is received by the end function.

In a step 400, the manycore processor 10 receives a frame by way of an Ethernet communication port.

In a step 401, the frame is transferred from the Ethernet communication port to the internal memory of an input/output cluster. This transfer is ensured by a static configuration of a direct memory access (DMA) controller of the manycore processor 10, and by using the network on chip NoC.

In a step 402, a first input/output core of the input/output cluster analyzes the MAC header and uses a predefined configuration table in order to determine the address of the mailbox to be used for storing the frame. During step 402, the address, in the internal memory, of the frame and the address, in the external memory, of the mailbox to be used for storing the frame are written, by the first input/output core, to the memory queue that is intended for this purpose.

In a step 403, a second input/output core of the input/output cluster carries out the transfer between the internal memory of the input/output cluster and the mailbox determined in the external memory. To achieve this, the second input/output core consults the content of the memory queue.

Figure 4B:
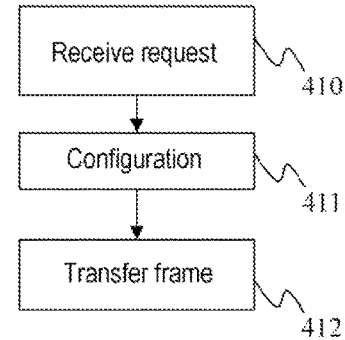
FIG. 4B schematically illustrates a transfer of a frame to an application cluster.

FIG. 4B schematically illustrates a transfer of a frame to an application cluster.

In a step 410, the third core of the input/output cluster implementing the requests service, which requests are in accordance with the standard ARINC 664 Part 7, receives a request in accordance with the standard ARINC 664 Part 7 from an application cluster implementing an application. This request indicates a number of a mailbox from which the application wishes to recover the data.

In a step 411, the third core configures hardware mechanisms of the processor 10, such as the direct memory access (DMA) controller and the network on chip NoC, so that they take charge of the effective transfer of the frame from the mailbox storing the frame to the application cluster that made the request.

In a step 412, the hardware mechanisms implement the transfer of the frame.

The sending part of a terminal uses a shared calendar comprising a succession of time periods. In this shared calendar, each time period may be associated with one or more virtual links on which frames have to be sent during the time period.

The shared calendar is populated by applications implemented by application clusters. When an application wishes to send a frame, it implements a sending mechanism.

In a first step of the sending mechanism, the application moves the frame from a mailbox containing the frame to the internal memory of the application cluster implementing the application. To this end, the application uses hardware mechanisms of the processor 10, such as the direct memory access (DMA) controller and the network on chip NoC. Each virtual link is associated with a memory queue of first in, first out type.

Following the placing of the frame in the internal memory of the application cluster, in a second step of the sending mechanism, the application posts a request to the memory queue that is associated with the virtual link concerned with the sending. The request indicates an identifier of the mailbox that has to be used.

In a third step of the sending mechanism, the resource management core of the application cluster then places, in the mailbox in question, the frame to be sent, and also an item of information comprising an address of the mailbox at a desired instant of sending in the shared calendar, in order to indicate that sending is to be carried out at the instant on the virtual link in question.

The shared calendar is stored in the internal memory of an input/output cluster. This calendar is read by a dedicated input/output core of the input/output cluster. When, at a current instant, the calendar indicates that sending of a frame has to be carried out on a given virtual link, the dedicated input/output core takes charge of the sending. To achieve this, the input/output core configures a hardware mechanism of the processor 10 that will send the useful data on an Ethernet port corresponding to the virtual link.

Figure 5A:
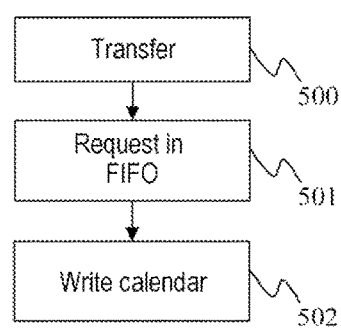
FIG. 5A schematically illustrates a method implemented by an application core of an application cluster implementing an application when a frame is sent by the application cluster.

FIG. 5A schematically illustrates a method implemented by an application core of an application cluster implementing an application when a frame is sent by the application cluster.

In a step 500 (first step of the sending mechanism), the application core of the application cluster implementing the application transfers a frame to be sent to the internal memory of the application group.

In a step 501 (second step of the sending mechanism), the application core posts a request to the memory queue that is associated with the virtual link concerned with the sending.

In a step 502 (third step of the sending mechanism), the resource management core of the application cluster places the frame to be sent in the mailbox concerned with the sending, and writes an item of information comprising an address of the mailbox at a desired instant of sending to the shared calendar.

Figure 5B:
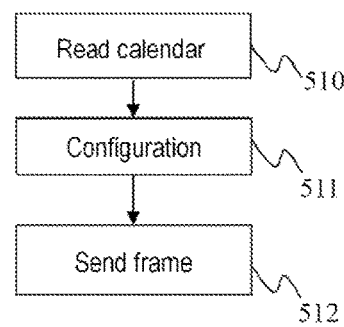
FIG. 5B schematically illustrates a method implemented by an input/output core of an input/output cluster when a frame is sent by an application cluster; and, FIG. 6 schematically illustrates mechanisms implemented by the manycore processor when a switch function is implemented by an application cluster.

FIG. 5B schematically illustrates a method implemented by an input/output core of an input/output cluster when a frame is sent by an application cluster.

In a step 510, the input/output core of the input/output cluster reads the calendar. This step is performed in real time and continuously by the input/output core. When, during reading of the calendar, at a current instant, an item of information comprising an address of a mailbox containing a frame to be transmitted is indicated, the input/output core moves to a step 511.

During step 511, the input/output core configures hardware mechanisms of the processor 10 that effectively implement the sending of the frame.

In a step 512, the hardware mechanisms effectively implement the sending of the frame.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A multiple-core processor-type device to be connected, by way of communication ports, to a deterministic switched Ethernet network comprising virtual links to which items of equipment are connected, the multiple-core processor-type device comprising a plurality of clusters each comprising a plurality of cores, at least one cluster of the multiple-core processor-type device is configured to implement a switch function to interconnect the items of equipment in the network, at least one cluster of the multiple-core processor-type device is configured to implement an end system function configured to provide functions of sending and receiving data in the network, and at least one cluster of the multiple-core processor-type device is configured to implement an application,
   wherein each cluster configured to implement the switch function is an application cluster of the multiple-core processor-type device that is configured to implement applications;
   wherein a plurality of application cores of the application cluster is configured to implement the switch function in a distributed manner; and
   wherein at least one first core of the plurality of application cores of each application cluster configured to implement the switch function is allocated to a function of routing frames received on a communication port of the multiple-core processor-type device, the routing function including analyzing each received frame and using a predefined static routing table in order to determine, for each received frame, a communication port of the multiple-core processor-type device on which each frame has to be sent, and a second core of the plurality of application cores of each application cluster configured to implement the switch function is allocated to a function of sending each received frame on the determined communication port.

2. The device according to claim 1, wherein each first core is configured to supply each received frame to be sent to the second core by way of a memory queue of first in, first out type.

3. The device according claim 1, wherein each cluster configured to implement the end system function comprises a reception part, the reception part being implemented by an input/output cluster of the multiple-core processor-type device that is dedicated to communicating with resources external to the multiple-core processor-type device, following a reception of a frame in an internal memory of the input/output cluster configured to implement the reception part of the end system function, a first input/output core, a second input/output core, and a third input/output core of the input/output cluster implement the reception part of the end system.

4. The device according to claim 3, wherein the first input/output core is configured to analyze a header of the frame and perform a search in a predefined configuration table in order to determine an address of a buffer memory zone in a memory external to the multiple-core processor-type device to be used for storing the frame, and the second input/output core provides a function of transferring the frame between the internal memory of the cluster and the external memory.

5. The device according to claim 3, wherein the third input/output core is configured to implement a requests service enabling application clusters of the multiple-core processor-type device that are configured to implement applications to access, by way of the input/output cluster configured to implement the reception part of the end system function, the external memory in order to recover data therefrom at the moment when the application requires them.

6. The device according to claim 1, wherein each cluster configured to implement the end system function comprises a sending part, the sending part configured to use a shared calendar stored in an internal memory of an input/output cluster of the multiple-core processor-type device that is dedicated to communicating with resources external to the multiple-core processor-type device, the calendar comprising a succession of time periods, each time period being able to be associated with one or more virtual links on which frames have to be sent during the time period, the calendar being populated by applications implemented by application clusters of the multiple-core processor-type device and being read by a core of a cluster configured to implement the sending part of the end system function that takes charge of each sending of a frame to be carried out when, at a current instant, the calendar indicating that sending of a frame has to be carried out.

7. A deterministic switched Ethernet network-type system comprising virtual links to which items of equipment are connected, the system further comprising a multiple-core processor-type device to be connected, by way of communication ports, to a deterministic switched Ethernet network using virtual links to which items of equipment are connected, the multiple-core processor-type device comprising a plurality of clusters each comprising a plurality of cores, at least one cluster of the multiple-core processor-type device configured to implement a switch function to interconnect the items of equipment in the network, at least one cluster of the multiple-core processor-type device configured to implement an end system function providing functions of sending and receiving data in the network, and at least one cluster of the multiple-core processor-type device configured to implement an application, wherein each cluster configured to implement the switch function is an application cluster of the multiple-core processor-type device that is able to implement applications;

wherein a plurality of application cores of the application cluster is configured to implement the switch function in a distributed manner; and wherein at least one first core of the plurality of application cores of each application cluster configured to implement the switch function is allocated to a function of routing frames received on a communication port of the multiple-core processor-type device, the routing function including analyzing each received frame and using a predefined static routing table in order to determine, for each received frame, a communication port of the multiple-core processor-type device on which each frame has to be sent, and a second core of the plurality of application cores of each application cluster configured to implement the switch function is allocated to a function of sending each received frame on the determined communication port.

8. A vehicle comprising a system according to claim 7.

9. The vehicle according to claim 8, wherein the vehicle is an aircraft.

* * * * *